US011905802B2

(12) United States Patent
Newport et al.

(10) Patent No.: US 11,905,802 B2
(45) Date of Patent: Feb. 20, 2024

(54) RING LATCH LOCKING SHAFT COUPLING FOR BI-DIRECTIONAL LOADING

(71) Applicant: Halliburton Energy Services, Inc., Houston, TX (US)

(72) Inventors: Casey Laine Newport, Tulsa, OK (US); David McManus, Tulsa, OK (US); Steven Andrew Lovell, Tulsa, OK (US); Andre Joseph Bernier, Tulsa, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 147 days.

(21) Appl. No.: 17/731,680

(22) Filed: Apr. 28, 2022

(65) Prior Publication Data
US 2023/0349274 A1    Nov. 2, 2023

(51) Int. Cl.
*E21B 43/12* (2006.01)
*F04D 13/02* (2006.01)
(Continued)

(52) U.S. Cl.
CPC ............ *E21B 43/128* (2013.01); *E21B 17/02* (2013.01); *E21B 17/046* (2013.01); *F04B 9/02* (2013.01);
(Continued)

(58) Field of Classification Search
CPC ...... E21B 43/128; E21B 17/02; E21B 17/046; F04D 13/021; F04D 13/086; F04D 13/10;
(Continued)

(56) References Cited

U.S. PATENT DOCUMENTS

| 3,832,076 A | 8/1974 | Gehrke |
| 5,688,067 A | 12/1997 | Straub |

(Continued)

FOREIGN PATENT DOCUMENTS

| CN | 106704248 A | 5/2017 |
| WO | 2010068833 A1 | 6/2010 |

OTHER PUBLICATIONS

Foreign Communication from Related Application—International Search Report and Written Opinion of the International Searching Authority, International Application No. PCT/US2023/013759, dated Jun. 12, 2023, 12 pages.

(Continued)

*Primary Examiner* — Peter J Bertheaud
(74) *Attorney, Agent, or Firm* — Conley Rose, P.C.; Rodney B. Carroll (57) ABSTRACT

An electrical submersible pump assembly comprising a first section and a second section with an outer housing and a drive shaft. A coupling assembly comprising a coupling, a thrust pin, and a retainer ring mechanically couples the first drive shaft to the second drive shaft. The coupling is generally cylindrical in shape with splines formed along the inner surface configured to transfer torque from the first shaft to the second shaft. The thrust pin is installed in a pin bore in the lower shaft and extends into a retainer bore in the upper shaft. The retainer ring is installed between a groove in the retainer bore and a retainer groove on the outside of the thrust pin. The thrust pin is configured to transfer tensile stress from the retainer bore in first drive shaft to the pin bore in the second drive shaft.

20 Claims, 6 Drawing Sheets

(51) Int. Cl.
  *F04D 13/10* (2006.01)
  *F04B 47/06* (2006.01)
  *F04B 9/02* (2006.01)
  *F04D 29/054* (2006.01)
  *E21B 17/02* (2006.01)
  *F04D 29/04* (2006.01)
  *F04D 29/044* (2006.01)
  *F04D 13/08* (2006.01)
  *E21B 17/046* (2006.01)
  *F16D 1/02* (2006.01)
  *F16D 1/116* (2006.01)
  *F16D 1/10* (2006.01)

(52) U.S. Cl.
  CPC ............ *F04B 47/06* (2013.01); *F04D 13/021* (2013.01); *F04D 13/086* (2013.01); *F04D 13/10* (2013.01); *F04D 29/044* (2013.01); *F04D 29/0405* (2013.01); *F04D 29/054* (2013.01); *F16D 1/02* (2013.01); *F16D 1/116* (2013.01); *F16D 2001/103* (2013.01); *Y10T 403/57* (2015.01); *Y10T 403/7033* (2015.01)

(58) Field of Classification Search
  CPC .. F04D 29/0405; F04D 29/044; F04D 29/054; F16D 1/02; F16D 1/116; F16D 2001/103; Y10T 403/57; Y10T 403/7033
  See application file for complete search history.

(56) References Cited

U.S. PATENT DOCUMENTS

| | | | | |
|---|---|---|---|---|
| 5,921,750 A * | 7/1999 | Gatz | ................... | F04D 1/06 415/214.1 |
| 6,883,604 B2 * | 4/2005 | Mack | ................... | F16D 1/108 464/182 |
| 7,325,601 B2 * | 2/2008 | Mack | ................... | F04D 13/021 166/105 |
| 7,775,779 B2 * | 8/2010 | Sheth | ................... | F04D 13/022 417/423.6 |
| 8,591,205 B2 * | 11/2013 | Brown | ................... | E21B 43/128 417/423.6 |
| 9,394,750 B2 * | 7/2016 | Pisetskiy | ................ | F16D 1/116 |
| 10,907,419 B2 | 2/2021 | Reeves et al. | | |
| 2002/0179305 A1 | 12/2002 | Mack et al. | | |
| 2009/0291001 A1 | 11/2009 | Neuroth et al. | | |
| 2011/0171047 A1 * | 7/2011 | Parmeter | ................ | F04B 47/02 29/525.02 |
| 2014/0209323 A1 | 7/2014 | Pisetskiy | | |
| 2020/0072296 A1 | 3/2020 | Mack et al. | | |
| 2021/0296970 A1 | 9/2021 | Crane et al. | | |

OTHER PUBLICATIONS

Foreign Communication from Related Application—International Search Report and Written Opinion of the International Searching Authority, International Application No. PCT/US2023/013762, dated Jun. 13, 2023, 9 pages.

Office Action (29 Pages), dated Sep. 14, 2023, U.S. Appl. No. 17/731,675, filed Apr. 28, 2022.

Filing Receipt, Specification and Drawings for U.S. Appl. No. 17/731,675, entitled "Spring Actuated Axially Locking Shaft Coupling for Bi-Directional Loading," filed Apr. 28, 2022, 44 pages.

* cited by examiner

RING LATCH LOCKING SHAFT COUPLING FOR BI-DIRECTIONAL LOADING

STATEMENT REGARDING FEDERALLY SPONSORED RESEARCH OR DEVELOPMENT

Not applicable.

CROSS-REFERENCE TO RELATED APPLICATIONS

None.

REFERENCE TO A MICROFICHE APPENDIX

Not applicable.

BACKGROUND

Electric submersible pump (ESP) systems are typically made from sub-assemblies, also called sections, coupled together in the manufacturing site or at the wellsite. The ESP system may include one or more pump sections, a pump intake, a seal section, and an electrical motor section. Each of these sections includes an outer housing, a mechanical coupling, and an inner shaft. The connections between the sections are interchangeable to allow for various combinations of sections during assembly. The outer housings are mechanically coupled together to withstand compression and tension loading. The inner shafts are connected with couplings designed to transmit torque and compression loading, but not loading in tension. This type of coupling allows for the sections to be coupled together by axially moving sections into contact with each other. The inner shafts slide into the coupling to mate without rotation as the outer housings come into contact with each other. Likewise, the inner shafts can uncouple as the outer housings are separated during disassembly.

These types of couplings for the inner shafts transmit compression loading from the pump section to a thrust bearing. The thrust bearing can prevent the axial compression loading from being transmitted to the motor section and is typically located between the pump section and the motor section. The thrust bearing provides support to the inner shaft to isolate the compression loading away from the motor section. In some scenarios, the operational characteristics of the ESP system may require the sections to be configured in a manner that results in both tension and compression loading of the inner shaft. For example, when the ESP system is configured to inject fluids into a formation. A second thrust bearing may be used to counteract the loading from the inner shaft in the second direction. However, the additional thrust bearing is expensive and may complicate assembly of the ESP system. A method of coupling the inner shafts to transfer tension and compression loads is desirable.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, orientation terms "upstream," "downstream," "up," and "down" are defined relative to the direction of flow of well fluid in the well casing. "Upstream" is directed counter to the direction of flow of well fluid, towards the source of well fluid (e.g., towards perforations in well casing through which hydrocarbons flow out of a subterranean formation and into the casing). "Downstream" is directed in the direction of flow of well fluid, away from the source of well fluid. "Down" and "downhole" are directed counter to the direction of flow of well fluid, towards the source of well fluid. "Up" and "uphole" are directed in the direction of flow of well fluid, away from the source of well fluid. "Fluidically coupled" means that two or more components have communicating internal passageways through which fluid, if present, can flow. A first component and a second component may be "fluidically coupled" via a third component located between the first component and the second component if the first component has internal passageway(s) that communicates with internal passageway(s) of the third component, and if the same internal passageway(s) of the third component communicates with internal passageway(s) of the second component.

Hydrocarbons, such as oil and gas, are produced or obtained from subterranean reservoir formations that may be located onshore or offshore. The development of subterranean operations and the processes involved in removing hydrocarbons from a subterranean formation typically involve a number of construction steps such as drilling a wellbore at a desired well site, isolating the wellbore with a barrier material, completing the wellbore with various production equipment, treating the wellbore to optimize production of hydrocarbons, and providing surface production equipment for the recovery of hydrocarbons from the wellhead.

During production operations, artificial lift systems (also referred to as production pumps), for example, electric submersible pump (ESP) systems or pumps located at the surface, may be used when reservoir pressure alone is insufficient to produce hydrocarbons from a well or is insufficient to produce the hydrocarbons at a desirable rate from the well. An ESP system is typically transported to the wellsite in sections assembled, attached to the production tubing, and conveyed into the wellbore by the production tubing to a target depth. The typical ESP system is configured with the pump section coupled to the production tubing. This orientation places the pump section above, or uphole, of the motor section.

The assembly of the sections typically include installation of a coupling to the inner shaft of one of the sections. The inner shaft and coupling can include splines to transmit torque from the motor section. The splines on the coupling and shaft can include an allowance fit for sliding engagement. Compression loading can be transferred from an upper shaft to a lower shaft through the face, e.g., end surface, of the shaft. The weight of the impellers, rotors, plungers, augers, or other pumping mechanism attached to the inner shaft of the pump section can be transferred downward, or downhole, to the inner shaft of the adjacent section, and eventually, the motor section. During pumping operations, the pump impellers can produce a resultant force in the downhole direction from the pressurization of the production fluids to lift these fluids in the uphole direction, e.g., to surface. A thrust bearing can be attached to an inner shaft to transfer the weight of the pump impellers and the resultant force from the operation of the pump to a bearing face attached to a housing. This thrust bearing can be located in one of the sections to prevent the compression force from being transferred to the motor section.

An ESP system can have multiple configurations that result in bi-directional loading of the shafts. In one scenario, an ESP system can be installed as an injection pump with the pump section below the motor section. In this configuration, the motor section and seal section can be located uphole of the inlet section and pump section. A seal, e.g., a packer, may be installed within the annular space between the outer surface of the pump section and the inner surface of the casing. The seal can direct the fluid within the annular space to flow into or enter the inlet section, to be pressurized, and exit the pump section below the seal. In this scenario, the weight of the drive shafts from the motor section to pump section can place the drive shafts in compression. A thrust bearing within the seal section can isolate the pump section from the compression force of the drive shafts. However, when the pump is in operation, a resultant force from the fluid within the impellers can generate a force in the uphole direction that places the pump drive shaft in compression. A second thrust bearing can be located between the pump section and motor section to isolate the motor section from the resultant force in the uphole direction. However, a second thrust bearing can be an expensive solution and complicate the assembly of the ESP system. A method of isolating the pump section from both forces in the uphole direction and downhole direction is desirable.

In another scenario, an ESP system may be installed on coil tubing to pump fluid from a reservoir to an annular space. An ESP system can be configured with the motor section and seal section located uphole of the pump exit and pump section. The pump section may have a seal, e.g., a packer, within the annular space between the ESP pump assembly and the inner surface of the casing. The seal can direct the fluid within the reservoir to flow into or enter the inlet section, to be pressurized, and exit the pump section above the seal into the annular space. In this scenario, the weight of the drive shafts from the motor section to pump section can place the drive shafts in compression. A thrust bearing within the seal section can isolate the pump section from this compression. However, when the pump is in operation, a resultant force from the fluid within the impellers can generate a force in the downhole direction that places a tensile load on the drive shaft within the seal section and pump section. A second thrust bearing can be installed to protect the pump section from the resultant force in the downhole direction. However, a second thrust bearing can be an expensive solution and complicate the assembly of the ESP system. A method of isolating the pump section from both forces in the uphole direction and downhole direction is desirable.

In a third scenario, an ESP system may be installed as an downhole power source, e.g., an electric generator. An ESP system can be configured with the pump section and seal section uphole of a generator section, e.g., the motor section. The pump section may be coupled to a production tubing with a discharge port located between the pump section and seal section. Injection fluid may be pumped from surface into the production tubing to drive or turn the rotors, e.g., turbines, within the generator section and exit into the wellbore through a discharge section. In this configuration, the weight of the drive shaft from the pump section can be isolated from the motor section by a thrust bearing in the seal section. However, when the generator is operating, a resultant force from the fluid within the impellers can generate a force in the uphole direction that places a compression load on the drive shaft within the seal section and pump section. A second thrust bearing can be installed to protect the pump section from the resultant force in the uphole direction. However, a second thrust bearing can be an expensive solution and complicate the assembly of the ESP system. A method of isolating the pump section from both forces in the uphole direction and downhole direction is desirable.

The present disclosure teaches a locking coupling assembly that overcomes this limitation by providing a locking mechanism configured to transfer tensile force. To protect the motor section from bidirectional forces transmitted along the inner shaft, a locking coupling assembly can be installed between each section of the ESP system. The face of the first shaft may abut or contact the face of the second shaft within the locking coupling assembly. A shaft locking mechanism can mechanically fix the axial distance between the upper and lower shaft inside the locking coupling assembly. Compressive force can be transferred through the face contact of the shafts. Tensile force can be transferred from the upper shaft to the lower shaft through the shaft locking mechanism. The loading through the locking coupling assembly may cycle from tension to compression during the operation of the ESP system. For example, when the ESP system is operating, the compressive force from the resultant force of the impellers within the pump section can be transferred from upper shaft to the lower shaft through the locking coupling assembly to the thrust bearing. In another scenario, when the pumping operation is paused, for example to monitor the reservoir behavior, the weight of the impellers within the pump section can place the upper and lower shafts in tension. The tensile force is transferred through the locking mechanism of the locking coupling assembly.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming, but would nevertheless be a routine undertaking for those of ordinary skill in the art having the benefit of the present disclosure.

Figure 1:
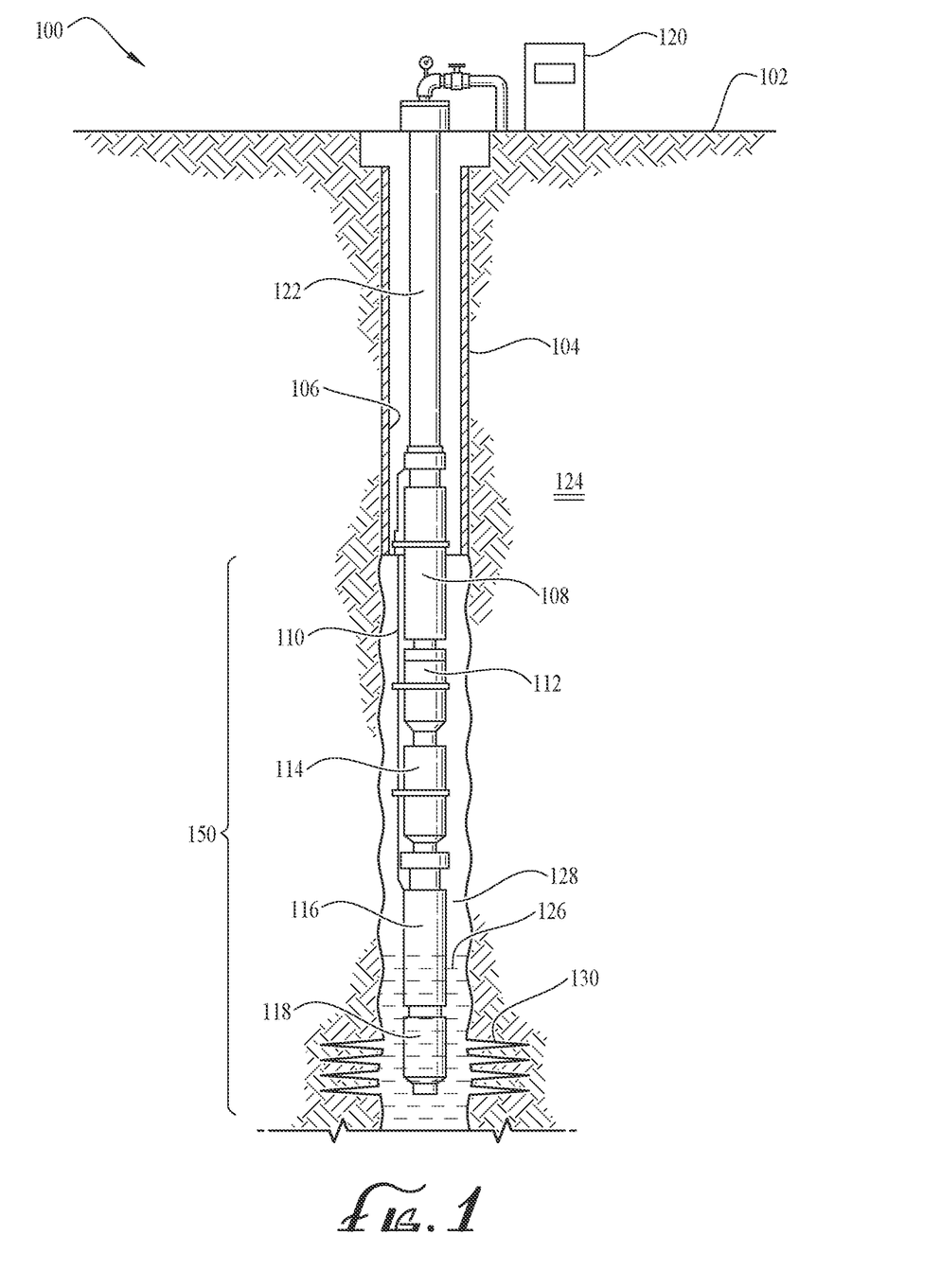
FIG. 1 is an illustration of an electric submersible pump assembly according to an embodiment of the disclosure.

FIG. 1 illustrates a well site environment 100, according to one or more aspects of the present invention. While well site environment 100 illustrates a land-based subterranean environment, the present disclosure contemplates any well site environment including a subsea environment. In one or more embodiments, any one or more components or elements may be used with subterranean operations equipment located on offshore platforms, drill ships, semi-submersibles, drilling barges, and land-based rigs.

In some embodiments, well site environment 100 comprises a wellbore 104 extending from a surface 102 to a permeable formation 124. In some embodiments, the wellbore 104 may comprise a nonconventional, horizontal, deviated, multilateral, or any other type of wellbore. Wellbore 104 may be defined in part by a casing string 106 that may extend from a surface 102 to a selected downhole location. Portions of wellbore 104 that do not comprise the casing string 106 may be referred to as open hole.

In some embodiments, various types of hydrocarbons or fluids may be pumped from wellbore 104 to the surface 102 via the production tubing 122 using an electric submersible pump (ESP) assembly 150 disposed or positioned downhole, for example, within, partially within, or outside casing string 106 of wellbore 104. ESP assembly 150 may comprise various assemblies or sub-assemblies referred to as sections including a pump section 108, an intake section 112, a seal section 114, a motor section 116, and a sensor package 118. In some embodiments, the pump section 108 may comprise one or more centrifugal pump stages, each centrifugal pump stage comprising an impeller mechanically coupled to a drive shaft and a corresponding diffuser held stationary by and retained within the centrifugal pump assembly (e.g., retained by a housing of the centrifugal pump assembly). In some embodiments, the pump section 108 may not contain a centrifugal pump but instead may comprise a rod pump, a piston pump, a progressive cavity pump, or any other suitable pump system or combination thereof.

The pump section 108 may transfer pressure to the production fluid 126 or any other type of downhole fluid to pump or lift the fluid 126 from the downhole reservoir to the surface 102 at a desired or selected pumping rate. In one or more embodiments, fluid 126 may enter the wellbore 104, casing string 106 or both through one or more perforations 130 in the formation 124 and flow uphole to the intake section 112 of the ESP assembly 150. In some embodiments, the intake section 112 includes at least one port or inlet for the production fluid 126 within the wellbore to enter into the ESP assembly 150. The intake section 112 can be fluidically connected to the annulus 128 for the transfer of production fluids 126 to the pump section 108. In some embodiments, the intake section 112 can be configured to intake a production fluid 126 with a mix of liquid and gas, separate the liquid portion, expel the gaseous portion, and transfer the liquid portion to the pump section 108. The centrifugal pump stages within the pump section 108 may transfer pressure to the fluid 126 by adding kinetic energy to the fluid 126 via centrifugal force and converting the kinetic energy to potential energy in the form of pressure. In one or more embodiments, pump section 108 lifts the fluid 126 to the surface 102. In some embodiments, the fluid 126 may be referred to as reservoir fluid.

Figure 2:
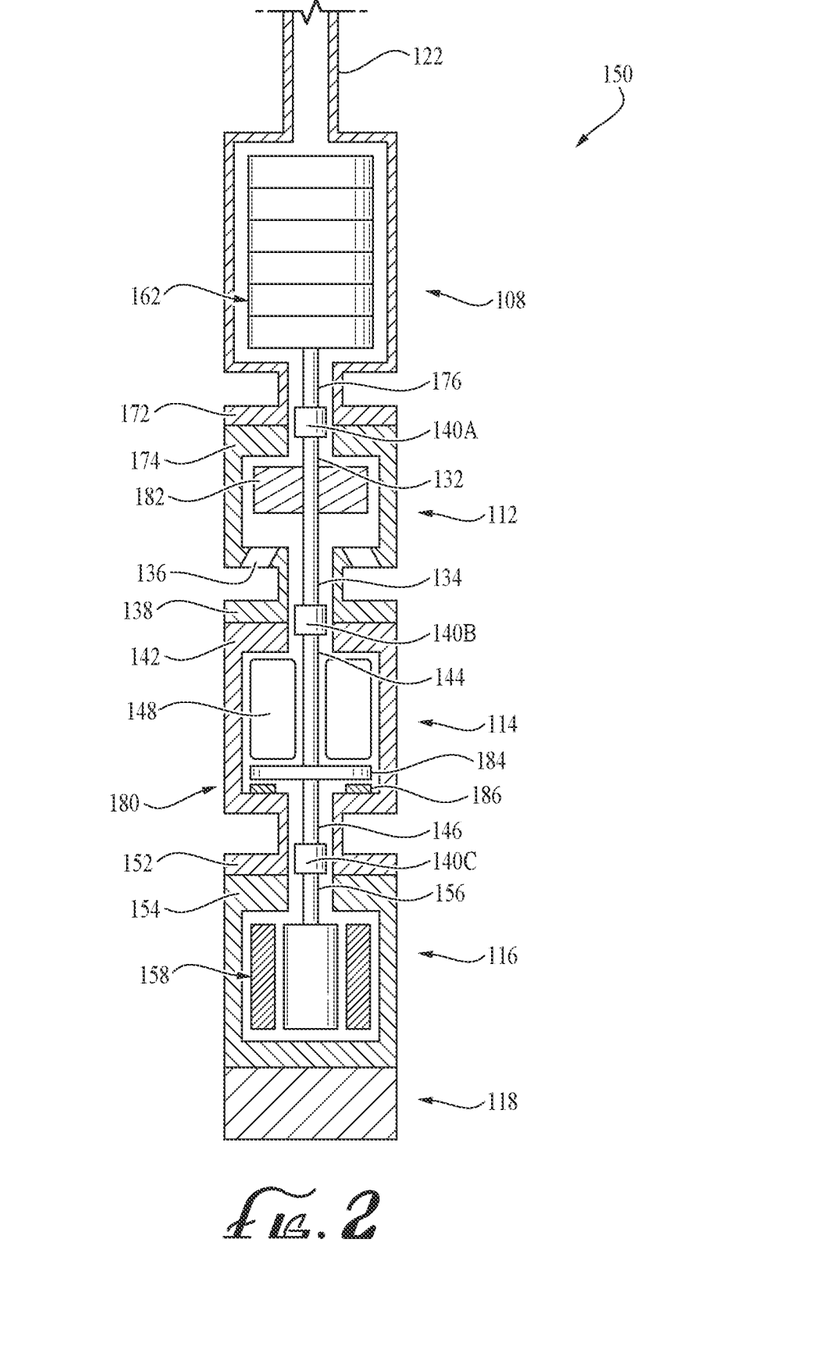
FIG. 2 is a partial cross-sectional view of the electric submersible pump assembly according to an embodiment of the disclosure.

In some embodiments, a motor section 116 can include a drive shaft and an electric motor 158 (see FIG. 2). In some embodiments, an electric cable 110 can be coupled to the electric motor 158 of the motor section 116 and to a controller 120 at the surface 102. The electric cable 110 can provide power and communication to the electric motor 158, transmit one or more control or operation instructions from controller 120 to the electric motor 158, or both. In some embodiments, the electric motor 158 may be a two pole, three phase squirrel cage induction motor or any other electric motor operable or configurable to provide rotational power.

In some embodiments, the rotational power of the motor section 116 can be transferred from the motor section 116 to the pump section 108 via a drive shaft. A drive shaft within the motor section 116 can rotationally couple to a drive shaft within the seal section 114. The drive shaft within the seal section 114 can rotationally couple to a drive shaft within the intake section 112. The drive shaft within the intake section can rotationally couple to the drive shaft within the pump section 108. The rotational power of the motor section 116 can be transferred to the pump section 108 via a plurality of drive shafts rotationally coupled together.

In some embodiments, the ESP assembly 150 can be an injection pump configured to pump various type of injection fluids into the formation 124. The ESP assembly 150 may be disposed downhole proximate the formation 124 and fluidically connected to a volume of fluid located at the surface 102 via the production tubing 122. The pump section 108 may pressurize the injection fluids from the surface 102 (via the production tubing 122) for placement within formation 124. The ESP assembly 150 comprises modular sections, e.g., pump section 108, that can be configured in various combinations. For example, although the ESP assembly 150 is shown configured with the pump section 108 uphole of the motor section 116, it is understood that the ESP assembly 150 can be configured with the motor section 116 above the pump section 108, or any number of combinations. For example, the ESP assembly 150 may be configured with the motor section 116 attached to the production tubing 122, the seal section 114 attached to the motor section 116, the intake section 112 attached to the seal section 114, the pump section 108 attached to the seal section 114, and the sensor package 118 attached to the pump section 108. Configuring the ESP assembly 150 with the pump section 108 below the motor section 116 for the injection of fluids into the formation 124 via the perforations 130 may be advantageous to provide cooling of the motor section 116 via the flow of injection fluids.

In some embodiments, the ESP assembly 150 can be reconfigured for use at the surface. For example, the ESP assembly 150 can be reconfigured as a production pump assembly located at surface 102. For example, the ESP assembly 150 can be reconfigured as a horizontal surface pump assembly configured to pump fluid from the production tubing 122 or into the production tubing 122 via a wellhead. The horizontal surface pump assembly can be fluidically connected to the production tubing 122 via a wellhead. The horizontal surface pump assembly can be located at surface 102 and configured to pump fluid, e.g., salt water, from a volume, e.g., pipeline or storage tank, into the production tubing 122 via the wellhead. In another scenario, the horizontal surface pump assembly can transfer, also referred to as boosting, fluid 126 from the production tubing 122 to another surface facility. The horizontal surface pump configuration (e.g., reconfiguration of the ESP assembly 150) may comprise at least one pump section 108, an intake section 112, a seal section 114 (also called a thrust chamber), and motor section 116. Although the horizontal surface pump configuration may have a different appearance than the downhole configuration of the ESP assembly 150, it is understood that the general description and function of the sections are the same. The horizontal surface pump reconfiguration of ESP assembly 150 may be mounted on a skid or installed within a surface facility.

FIG. 2 is an illustrative representation of the ESP assembly 150 according to some embodiments of the present disclosure. The ESP assembly 150 can be configured with the pump section 108 uphole, e.g., above, the motor section 116. The ESP assembly 150 can couple the pump section 108 to the production tubing 122 and the intake section 112. The bottom flange 172 of the outer housing of the pump section 108 can mechanically couple to the top header 174 of the outer housing of the intake section 112. The pump section 108 can include a lower shaft 176, e.g., a drive shaft, mechanically coupled to the impellers 162 of the centrifugal pump stages.

A first coupling assembly 140A can mechanically couple the drive shafts of two sections, for example, the pump section 108 and the intake section 112. The coupling assembly 140A can include a coupling to rotationally couple the lower shaft 176 of the pump section 108 to the upper shaft 132 of the intake section 112. The drive shaft, e.g., upper shaft 132 and lower shaft 176, can be rotationally coupled to the coupling assembly 140A with splines. The coupling assembly 140A can transmit the axial forces of tension and compression from a first drive shaft to a second drive shaft, e.g., upper shaft 132 and lower shaft 176, as will be described hereinafter.

The intake section 112 can include an upper shaft 132, a lower shaft 134, and an intake port 136. In some embodiments, the intake section 112 can include a gas separator mechanism 182 that may be mechanically coupled to the drive shaft or may not be coupled to the drive shaft. In some embodiments, the drive shaft, e.g., the upper shaft 132 and lower shaft 134, may be coupled or may be a unitary construction. The bottom flange 138 of the outer housing of the intake section 112 can mechanically couple to the top header 142 of the outer housing of the seal section 114.

A second coupling assembly 140B may mechanically couple the drive shaft of the intake section 112 to a drive shaft of the seal section 114. The second coupling assembly 140B may be similar to the first coupling assembly 140A and may transfer axial forces of tension and compression. The seal section 114 can include a drive shaft, e.g., an upper shaft 144 and a lower shaft 146, and a seal mechanism 148. The seal mechanism 148 comprises a shaft seal, a bag seal, a labyrinth seal, or combinations thereof. In some embodiments, the seal section 114 can include a thrust bearing mechanism 180 comprising a dynamic bearing 184 mechanically coupled to the shaft and a static bearing 186 coupled to the housing. In some embodiments, the upper shaft 144 and lower shaft 146 may be coupled or may be a unitary construction. The bottom flange 152 of the outer housing of the seal section 114 can mechanically couple to the top header 154 of the outer housing of the motor section 116.

A third coupling assembly 140C may rotationally couple the drive shaft of the seal section 114 to the drive shaft of the motor section 116. The third coupling assembly 140C may be similar to the second coupling assembly 140B and may transfer axial forces of tension and compression. The motor section 116 can comprise an upper shaft 156, e.g., the drive shaft, and an electric motor 158. The third coupling assembly 140C may rotationally couple the lower shaft 146 of the seal section 114 to an upper shaft 156 of the motor section 116. The electric motor 158 may be coupled to a downhole sensor, for example within the sensor package 118.

In operation, the upper shaft 156 of the motor section 116 may transmit or communicate the torque of the electric motor 158 to the lower shaft 146 of the seal section 114, from the upper shaft 144 of the seal section to the lower shaft 134 of the intake section 112, and from the upper shaft 132 of the intake section 112 to the lower shaft 176 of the pump section 108. The lower shaft 176, e.g., the drive shaft, of the pump section 108 can provide rotational torque and power to one or more fluid movers, impellers, centrifuge rotors, pump rods, or augers of the pump section 108. The electric motor 158 may be rotationally coupled to the drive shaft of the seal section 114 by a third coupling assembly 140C. The drive shaft of the seal section 114 may be rotationally coupled to the intake section 112 by a second coupling assembly 140B. The drive shaft of the intake section 112 may be rotationally coupled to the pump section 108 by a first coupling assembly 140A.

The coupling assembly 140 may transfer axial loading from a first drive shaft to a second drive shaft. For example, as shown in FIG. 2, the coupling assembly 140C can transfer axial tension from the thrust bearing mechanism 180 to the electric motor 158. The weight of the internal components of the electric motor 158, e.g., rotors, may be transferred from the upper shaft 156 of the motor section 116 to the lower shaft 146 of the seal section 114 via the coupling assembly 140C. The weight of the internal components of the electric motor 158 can be transferred from the dynamic bearing 184 attached to the drive shaft to the static bearing 186 of the thrust bearing mechanism 180. In some embodiments, the ESP assembly 150 may be configured as an injection pump with the pump section 108 located below the thrust bearing mechanism 180. The pump section 108 may produce an additional tensile load transferred via the coupling assembly 140, in the form of a resultant force, from the transfer of mechanical energy from the impellers 162 to pressurize the fluid.

In another scenario, the coupling assembly 140 may transfer axial compression from one drive shaft to another. For example, the weight of the impellers 162 coupled to the drive shaft of the pump section 108 may be transferred to the dynamic bearing 184 of the thrust bearing mechanism 180 via the coupling assembly 140A, the drive shaft of the intake section 112, the coupling assembly 140B, and the drive shaft of the seal section 114. During pumping operations, the impellers 162 may produce an additional compressive load, or a resultant force, due to the transfer of mechanical energy from the impellers 162 to pressurize the fluid 126.

Although the ESP assembly 150 is illustrated with the pump section 108 above the motor section 116, it is understood that the sections may be assembled in any order. For example, the motor section 116 may be uphole of the pump section 108.

Figure 3A:
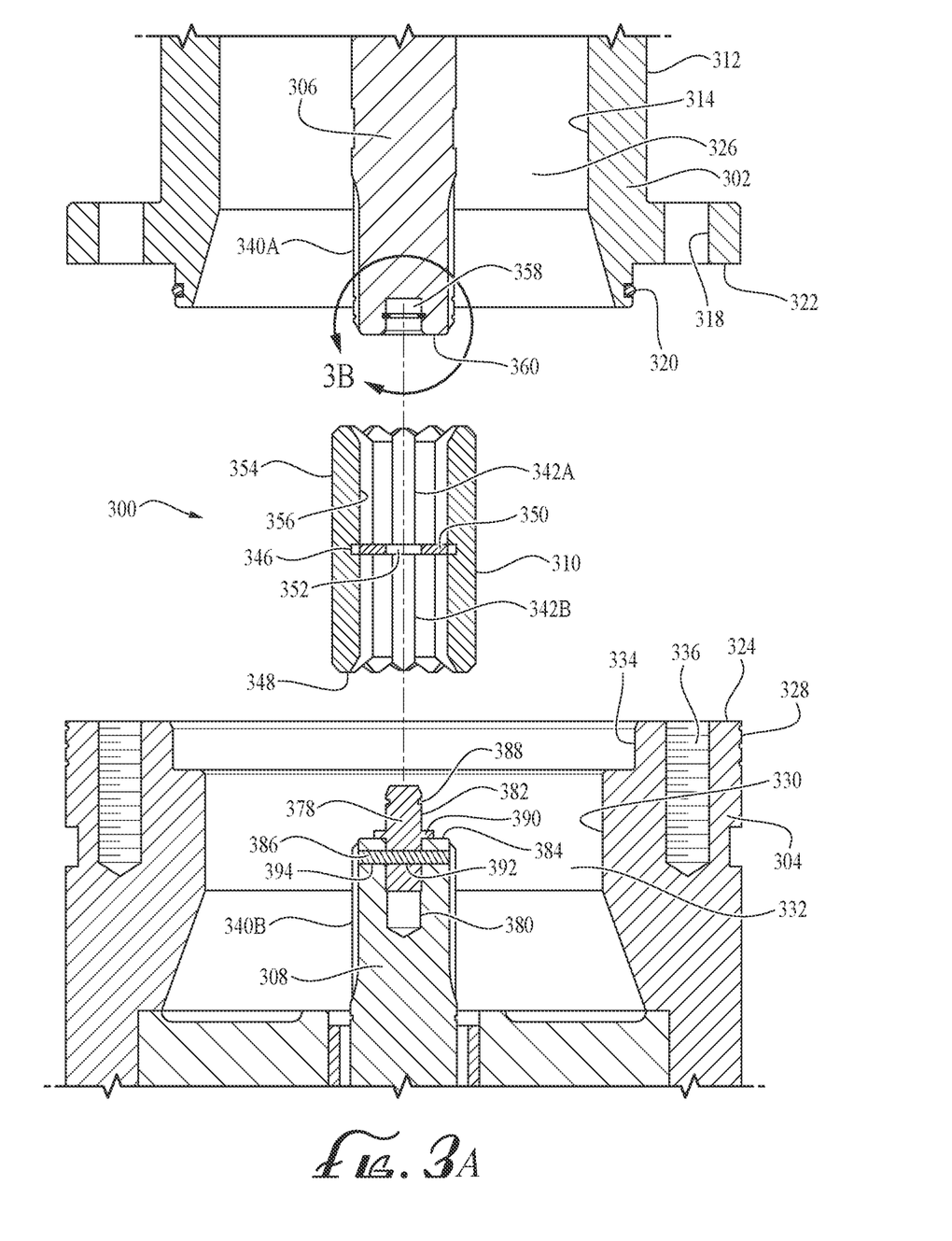
FIG. 3A is partial cross-sectional view of a coupling assembly according to an embodiment of the disclosure.

Turning now to FIG. 3A, an embodiment of the coupling assembly 140 is illustrated. For example, FIG. 3A is a partial cross-sectional view of an exemplary coupling assembly 300 of the ESP assembly 150, according to one or more embodiments of the present disclosure. The coupling assembly 300 may couple a first shaft of a first section to a second shaft of a second section of the ESP assembly 150. It is understood that the coupling assembly 300 is exemplary of the mechanical coupling between of any two of the sections, for example, the coupling assembly 300 can connect the drive shaft of the motor section 116 to the drive shaft of the seal section 114, the drive shaft of the intake section 112, the drive shaft of the pump section 108, or combination thereof.

It is understood that although one of each section is listed, the coupling assembly 300 can connect two or more of the same section, for example a first pump section to a second pump section, e.g., pump section 108.

The coupling assembly 300 can include similar features, as shown in FIG. 2, such as a lower shaft 176, an upper shaft 132, and a coupling assembly 140A. As illustrated in FIG. 3A, the coupling assembly 300 comprises an upper shaft 308, a lower shaft 306, a coupling 310, and a thrust pin 378. The coupling 310 may be cylindrical in shape with an outer surface 354, an inner surface 356, and an end surface 348. The lower shaft 306 and upper shaft 308 can be generally cylindrical in shape with splines, e.g., splines 340A and 340B, formed on the outer surface and a retainer bore 358. The splines are generally described as external teeth formed with a radial series of grooves cut or broached in a longitudinal direction on the outer surface of the shaft. The coupling 310 may have splines 342A, 342B, e.g., longitudinal teeth and grooves, formed along the inner surface 356 that mate with the splines 340A, 340B of the shafts 306, 308. The coupling 310 includes a recess 346 located within the inner surface 356 proximate to the center from the end surface 348 or about half the axial length of the coupling 310. A coupling plate 350, generally shaped as a washer, a thin round plate with a port 352 can be installed within the recess 346.

Figure 3B:
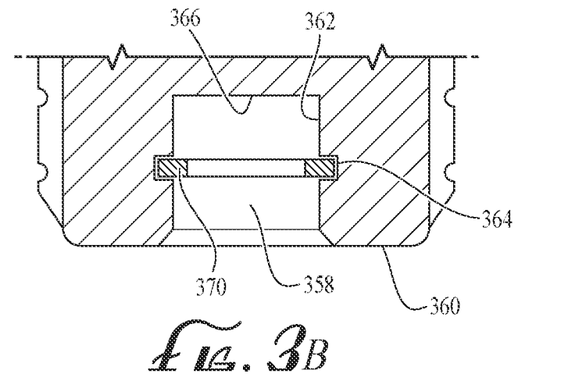
FIG. 3B is a detail view of a portion of the coupling assembly according to an embodiment of the disclosure.

Turning now to FIG. 3B, the lower shaft 306 can include a retainer bore 358 defined by an inner surface 362, a retainer groove 364, and an end surface 366. A retainer ring 370 can be installed in the retainer groove 364. The retainer ring 370 can be a generally ring shape with a rectangular cross-section. In some embodiments, the retaining ring 370 may be stamped from a sheet of material and comprise a c-shape or a ring shape with a gap in the circumference of the material. In some embodiments, the retaining ring 370 may be formed by wrapping a shaped wire in a circular pattern for more than 360 degrees. For example, the shaped wire forming the retaining ring 370 can be wound helically like a spring for 1½ wraps or 540 degrees. Although 1½ wraps is described, it is understood that the retaining ring can be wrapped any number of times, i.e., 1, 1¼, 1½, 1¾, 2, 2¼, 2½, 2¾, 3, or any fraction of a wrap in the range of 1 to 3 wraps. The cross-section of the shaped wire can be any geometrical shape, for example, circular, square, rectangular oriented in the radial direction, rectangular oriented in the longitudinal direction, triangular, hexagonal, star shaped, or any combination thereof. In some embodiments, the retainer bore 358 can include two or more retaining rings 370 installed in corresponding retainer grooves 364. For example, the retainer bore 358 can include a first retaining ring 370A installed in a first retaining groove 364A and a second retaining ring 370B installed in a second retaining groove 364B. The retaining ring 370 may be made from a grade of stainless steel, nickel alloy steel (e.g., Inconel), or any material suitable for the wellbore environmental conditions.

The upper shaft 308 can include a pin bore 380 extending axially for a portion of the overall length from the end surface 384. The thrust pin 378 can be installed into the pin bore 380. The thrust pin 378 can be generally cylindrical in shape with a lower portion installed with an allowance fit into the pin bore 380. The thrust pin can include a locking groove 388 in the upper portion and an alignment feature 390. The alignment feature 390 may be a thin and generally circular shape protruding from the outer surface 382. The lower surface of the alignment feature 390 may directly contact the end surface 384 of the upper shaft 308. The alignment feature 390 may be configured to align a shear pin bore 392 with a corresponding feature, e.g., shear pin bore 394, of the upper shaft 308. A shear pin 386 can be installed into the shear pin bore 394 of the upper shaft 308 and shear pin bore 392 of the thrust pin 378. The shear pin 386 may be made from a brass, a stainless steel, or any other commonly used shearable material suitable for the wellbore environmental conditions.

The outer housing of a first section can include a bottom flange, e.g., bottom flange 302. The bottom flange 302 can be generally cylindrical in shape with an outer surface 312, an inner surface 314, and an inner chamber 326. The bottom flange 302 can include a plurality of anchor ports 318 and a seal 320. The bottom flange 302 may be any of the bottom flanges illustrated in FIG. 2, for example, bottom flange 172. The outer housing of a second section can include a top header, e.g., top header 304. The top header 304 can be a generally cylindrical shape with an outer surface 328, an inner surface 330, and an inner chamber 332. The top header 304 can also include a plurality of anchor ports 336 and a seal surface 334. The top header 304 may be any of the top headers illustrated in FIG. 2, for example, top header 174.

The assembly of the ESP pump assembly 150 (as shown in FIG. 2) can be performed at a remote wellsite. The ESP assembly 150 may be transported to the remote wellsite as separate sections, e.g., the pump section 108. The assembly of the ESP pump assembly 150 can begin with the lower most portion or the portion to enter wellbore first, for example, the sensor package 118 can be attached or assembled to the motor section 116. The seal section 114 can be attached or coupled to the portion comprising the motor section 116 and the sensor package 118. As previously described, the bottom flange 152 of the outer housing of the intake section 112 can mechanically couple to the top header 154 of the outer housing of the motor section 116. The upper shaft 156 of the motor section 116 can be mechanically coupled to the lower shaft 146 of the seal section 114 with the coupling assembly 140C as will be described hereinafter. Although the assembly of the ESP assembly 150 as shown in FIG. 2 is described, it is understood that the sections of the ESP assembly 150 are modular and may be assembled in another order or sequence for different type of ESP assembly, e.g., an injection pump.

Figure 4:
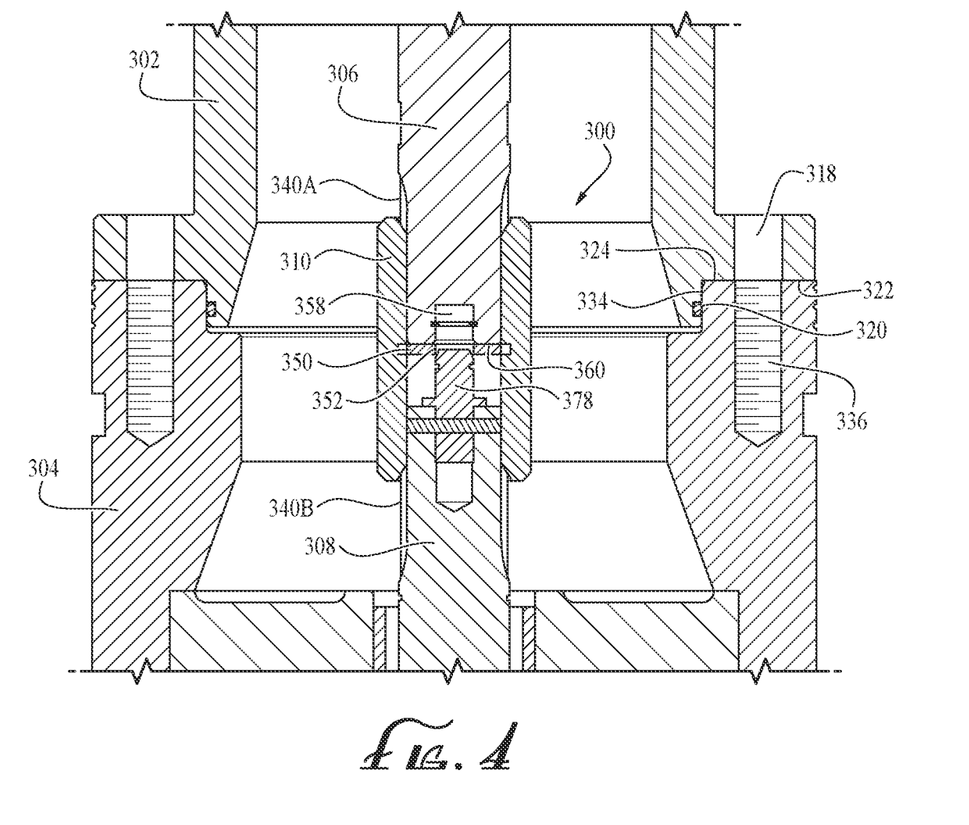
FIG. 4 is another cross-sectional view of the coupling assembly according to an embodiment of the disclosure.
Figures 5A, 5B:
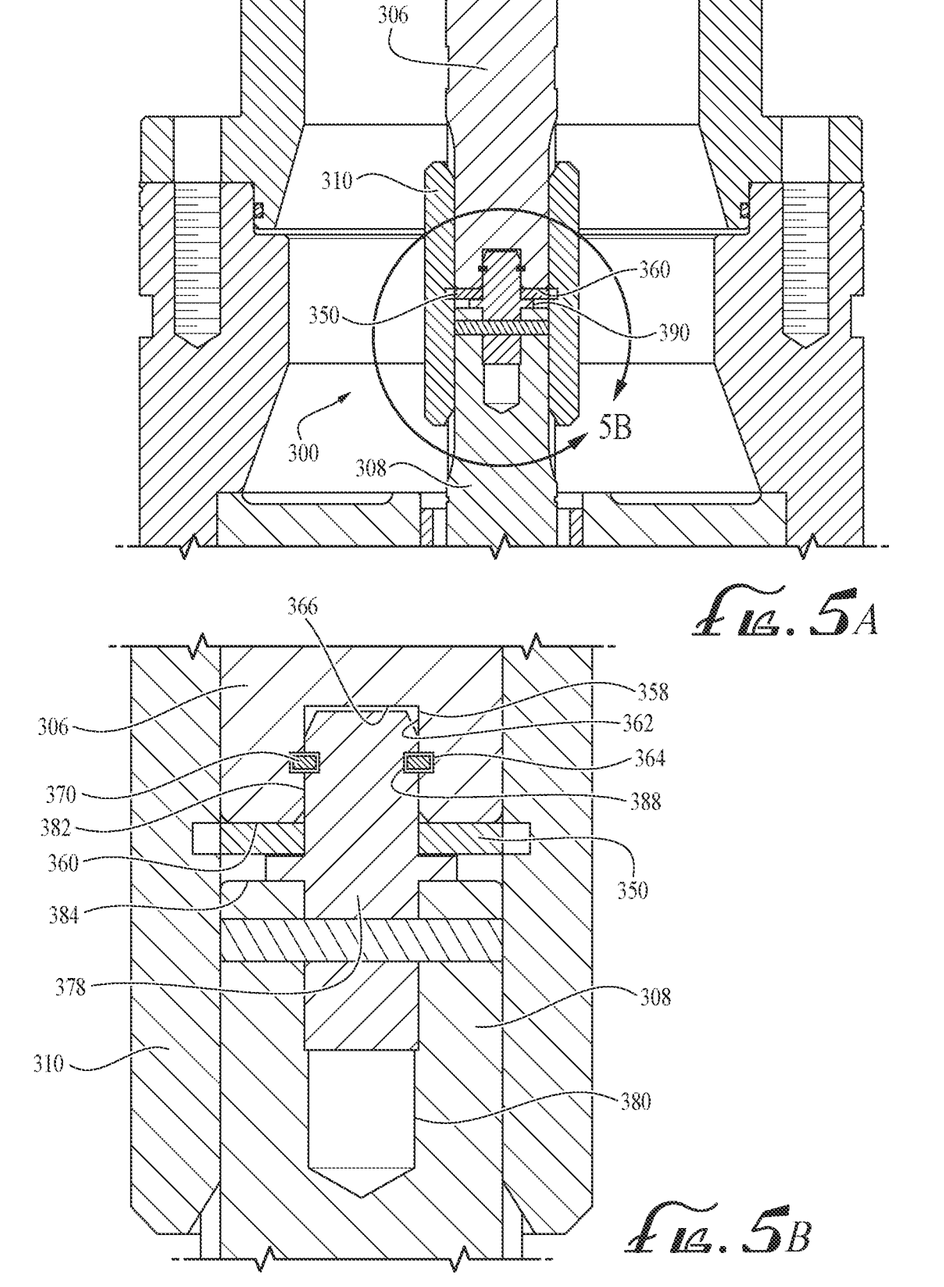
FIG. 5A and FIG. 5B is still another cross-sectional view of the assembly of the coupling assembly according to an embodiment of the disclosure.

The process of coupling an upper shaft of a first section to the lower shaft of a second section with a coupling assembly, e.g., 140C, can be described with an embodiment of the coupling assembly 300. The process of coupling the coupling assembly 300 is illustrated in FIG. 4 and FIG. 5 and described herein. Turning to FIG. 4, the coupling assembly 300 can be mated by aligning the bottom flange 302 of the first section to the top header 304 of the corresponding section. The upper shaft 308 can be aligned to the lower shaft 306 with the coupling 310. The alignment process can begin with shifting the axial position of each shaft to a first position. The upper shaft 308 and/or lower shaft 306 may be moved, or shifted axially, to a first position away from each other to maximize the gap or distance between the upper shaft 308 and lower shaft 306. The amount of axial movement may be limited by the mechanisms coupled to each shaft. For example, the movement of the pump shaft, e.g., shaft 176 in FIG. 2, may be limited by the impellers 162 coupled to the pump shaft. Each shaft, e.g., upper shaft 308, may have a first position, e.g., an upper axial position, and a second position, e.g., a lower axial position, during the assembly process. For example, the lower shaft 306 may be positioned in a first position, e.g., an upper axial position, and the upper shaft 308 may be positioned in a first position, e.g., a lower axial position, to create a gap or a predetermined distance between the end surfaces of each shaft. The coupling 310 can be installed on one of the shafts, for example, as shown in FIG. 4, the lower shaft 306 by aligning the splines 340A of the lower shaft 306 with the corresponding splines 342A of the coupling 310 and sliding the coupling 310 onto the lower shaft 306 until the end surface 360 contacts the coupling plate 350. The splines 340B of the upper shaft 308 can align with the splines 342B of the coupling 310 as the upper and lower sections are brought together. The outer housings of each section can be coupled by moving the bottom surface 322 of the bottom flange 302 into contact with the end surface 324 of the top header 304. The seal 320 of the bottom flange 302 can fluidically seal to the seal surface 334 of the top header 304. The plurality of anchor ports 318 in the bottom flange 302 can be aligned with the corresponding anchor ports 336 on the top header 304 and a suitable fastener, e.g., a bolt, (not shown) can be installed.

Turning now to FIG. 5A, the assembly of the coupling assembly 300 can be completed by urging the shafts together. The upper shaft 308 of the lower section and the lower shaft 306 of the upper section can be urged together, or towards the opposite shaft. In this illustration, the upper shaft 308 can be shifted axially from a first position to a second position wherein the second position is proximate to the lower shaft 306. The thrust pin 378 moves into the retainer bore 358 and towards the end surface 366 as the upper shaft 308 is urged forward. The outer surface 382 of the thrust pin 378 will contact and expand the retaining ring 370 installed in the groove 364 of the retainer bore 358. The retaining ring 370 in the expanded position will slide along the outer surface 382 of the thrust pin 378. The retaining ring 370 will snap, or return to the installed shape, into the locking groove 388 when the locking groove 388 on the thrust pin 378 aligns with the groove 364 in the retainer bore 358. The alignment of the grooves coincides with the contact of the coupling plate 350 to the alignment feature 390 on the thrust pin 378.

Although the coupling assembly 300 is described in one orientation, it is understood that the coupling assembly 300 may be configured in the opposite orientation. For example, the thrust pin 390 can be installed in the lower shaft 306 and the retainer ring 370 in the upper shaft 308. Likewise, with an ESP assembly 150 reconfigured as a horizontal surface pump assembly, the thrust pin 390 can be installed on the drive shaft oriented towards the motor section or installed on the drive shaft oriented away from the motor section.

In some embodiments, a compression force can be transferred from a first shaft, e.g., the lower shaft 306, to the opposite shaft, e.g., the upper shaft 308, via the coupling assembly 300. A compression force or force directed towards the opposite shaft, can be transferred from the end surface 360 of the lower shaft 306 through the coupling plate 350 to the alignment feature 390 of the thrust pin 378 and into the end surface 384 of the upper shaft 308. The compression force does not stress the retainer ring 370 as the locking groove 388 on the thrust pin 378 and the groove 364 on the retainer bore 358 are aligned.

In some embodiments, a tensile force can be transferred from a first shaft to the opposite shaft via the coupling assembly 300. A tensile force, or force directed away from the opposite shaft, can be transferred from the lower shaft 306 to the upper shaft 308 via the shear pin 386 installed in the thrust pin 378. For example, a tensile force in the lower shaft 306 can be transferred to the groove 364 in the retainer bore 358 and to the locking groove 388 in the thrust pin 378 via the retaining ring 370, to the shear pin bore 392 of the thrust pin 378 and to the shear pin bore 394 of the upper shaft 308 via the shear pin 386.

In some embodiments, the coupling assembly 300 can be released by exceeding the shear rating of the shear pin 386. The shear pin 386 can be designed to shear, e.g. to break into three pieces, when the tensile force applied from a first shaft to the opposite shaft exceeds a predetermined value. The shear pin 386 can be configured to allow for the disassembly of the coupling assembly 300.

Figure 6A:
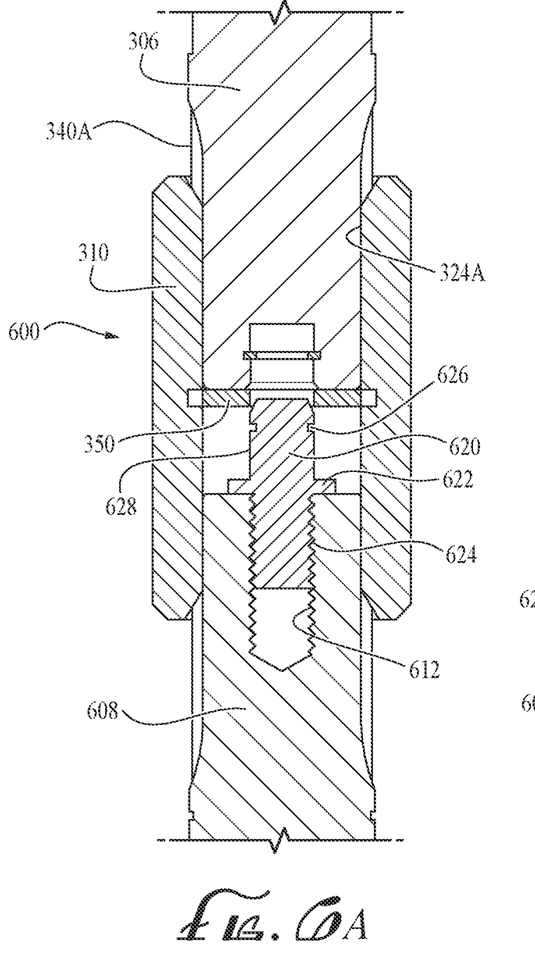
FIG. 6A is a cross-sectional view of another coupling assembly according to an embodiment of the disclosure.

Turning now to FIG. 6A, an alternate implementation of the connection assembly 600 is described. In some embodiments, the connection assembly 600 comprises a lower shaft 306, an upper shaft 608, a coupling 310, a coupling plate 350, a retainer ring 370, and a thrust pin 620. The coupling 310 can be installed on the lower shaft 306 until the end surface 360 contacts the coupling plate 350 installed within the coupling 310. The splines 342A of the coupling 310 can be mated to the splines 340A on the lower shaft 306. The connection assembly 600 can share features of the coupling assembly 300 from FIGS. 3-5, and are similarly marked.

In some embodiments, the thrust pin 620 can be threaded into the upper shaft 608. The thrust pin 620 can be generally cylindrical in shape with an upper portion 628, an alignment feature 622, and a lower portion 624. The upper outer surface can be cylindrical in shape with a retainer groove 626. The lower portion 624 can be cylindrical in shape and threaded.

In some embodiments, the upper shaft 608 is generally cylindrical in shape and includes an end surface and a threaded port 612. The upper shaft 608 includes splines 640 formed on the outer surface similar to splines 340B of FIG. 3A. The thrust pin 620 can be threadingly coupled to the upper shaft 608 via the lower portion 624 and threaded port 612.

The connection assembly 600 can be assembled in a similar manner as coupling assembly 300. As previously described, the upper shaft 608 and lower shaft 306 can be positioned in a first position by shifting or moving the axial position of each shaft. The coupling 310 can be installed on one of the two shafts, e.g., lower shaft 306 or upper shaft 608, by aligning the splines and sliding the coupling 310 onto the mating splines, e.g., splines 340A, of the shaft, e.g., lower shaft 306. The shaft without the coupling, e.g., upper shaft 608, can be positioned to abut the coupling 310. The splines 640 of the upper shaft 608 can be aligned with the corresponding splines, e.g., splines 342B, of the coupling 310.

As previously described, the lower shaft 306 and the upper shaft 608 can be urged to a second position that positions the retaining ring 370 into the retaining ring groove 688. The upper shaft 608 can axially move into a second position wherein the end surface 360 of the upper shaft contacts the coupling plate 350, the coupling plate 350 is in direct contact with the alignment feature 622 of the thrust pin 620, and the alignment feature 622 is in contact with the end surface 630 of the upper shaft 608. The direct contact of the alignment feature 622 to the coupling plate 350 in the installed position on the lower shaft 306 can align the retainer groove 626 on the thrust pin 620 with the groove 364 within the retainer bore 358 on the lower shaft 306. The retaining ring 370 will snap, or return to the installed shape, into the retainer groove 626 when the retainer groove 626 on the thrust pin 620 aligns with the groove 364 in the retainer bore 358.

Figure 6B:
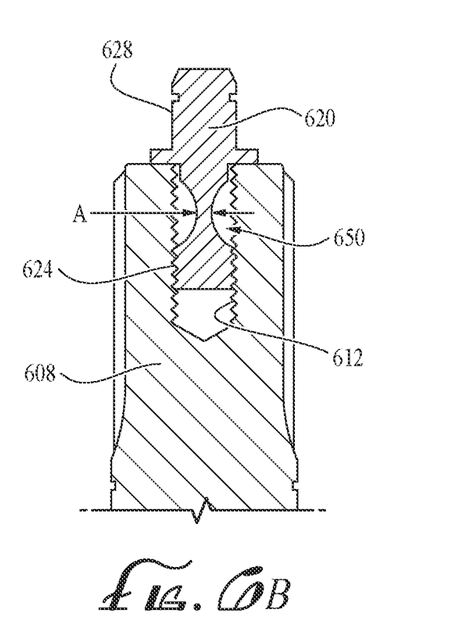
FIG. 6B is a cross-sectional view of an embodiment of the thrust pin for a coupling assembly according to an embodiment of the disclosure.

Turning now to FIG. 6B, an alternate implementation of the connection assembly 600 is described. In some embodiments, the thrust pin 620 includes a shear mechanism 650 configured to shear, e.g., break apart, with a predetermined stress state. In the example illustrated in FIG. 6B, the shear mechanism comprises a reduced area cross-section similar in shape to the middle section of a hourglass. The middle section labeled "A" can be a reduced diameter with a tensile shear value lower than the threaded portion of the lower portion 624 or the cross-section shear value of the upper portion 628. Although the shear mechanism 650 is illustrated as an hourglass shape, it is understood that the shear mechanism 650 may be shown as any means to reduce the cross-section of material, such as a groove, a slot, a hole, or any other means of reduced cross-section of material. Although the shear mechanism 650 is shown in the lower portion 624, it is understood that the shear mechanism 650 may be located in the lower portion 624, the upper portion 628, or both. Although the thrust pin 620 is illustrated with one shear mechanism 650, it is understood that the thrust pin 620 may have two or more shear mechanisms 650.

ADDITIONAL DISCLOSURE

The following are non-limiting, specific embodiments in accordance and with the present disclosure:

A first embodiment, which is a pump assembly, comprising a first section including a first outer housing and a first drive shaft, wherein the first outer housing is generally cylindrical with an inner chamber and the first drive shaft is generally cylindrical with splines on an outer surface and a retainer bore; a second section including a second outer housing and a second drive shaft, wherein the second outer housing is generally cylindrical with an inner chamber and the second drive shaft is generally cylindrical with splines on an outer surface and a pin bore; wherein the first outer housing of the first section is mechanically coupled to the second outer housing of the second section; a coupling assembly comprising a coupling, a thrust pin, and a retainer ring, wherein the coupling is generally cylindrical in shape with an outer surface and splines formed along an inner surface, wherein the retainer ring is generally a shaped wire wound into a circular shape and installed within a retainer groove within the retainer bore, wherein the thrust pin is generally cylindrical in shape with an upper portion, a lower portion, and installed into the pin bore; wherein the coupling assembly mechanically couples the first drive shaft and the second drive shaft; wherein the coupling is configured to transmit torque from the first drive shaft to the second drive shaft via the splines; and wherein the thrust pin is configured to transfer tensile stress from the retainer bore in first drive shaft to the pin bore in the second drive shaft.

A second embodiment, which is the pump assembly of the first embodiment, wherein a groove on an outer surface of the thrust pin aligns with the retainer groove within the retainer bore of the first drive shaft, and wherein the retainer ring spans from the retainer groove within the retainer bore to the retainer groove on the thrust pin.

A third embodiment, which is the pump assembly of any of the first and the second embodiments, wherein the retainer ring is configured to install into the retainer groove on the thrust pin from the retainer groove within the retainer bore.

A fourth embodiment, which is the pump assembly of any of the first through the third embodiments, wherein the thrust pin is mechanically coupled or releasably coupled to a first drive shaft.

A fifth embodiment, which is the pump assembly of the fourth embodiment, wherein the thrust pin is releasably coupled by a shear pin or a shear mechanism.

A sixth embodiment, which is the pump assembly of any of the first through the fifth embodiments, wherein the retainer bore includes at least two retaining rings located within at least two groove with the retainer bore.

A seventh embodiment, which is the pump assembly of any of the first through the sixth embodiment, wherein the first and second section is selected from a group consisting of a pump section, an intake section, a seal section, a motor section, or combinations thereof.

A eighth embodiment, which is the pump assembly of any of the first through the seventh embodiments, wherein the pump assembly is a horizontal surface pump assembly or an electrical submersible pump assembly.

A ninth embodiment, which is the pump assembly of any of the first through the eighth embodiments, wherein the pump assembly produces fluid from a formation to a location at surface or injects fluid from a volume at surface into a formation.

A tenth embodiment, which is a coupling assembly adapted to connect a first shaft with a second shaft, the coupling assembly comprising a coupling 310 generally cylindrical in shape with splines formed longitudinally along an inner surface; a thrust pin 378 generally cylindrical in shape with an alignment feature and a retainer groove on an outer surface of an upper portion; a retainer bore 358 extending into the first shaft comprising a retainer groove and a retaining ring; a pin bore 380 extending into the second shaft; wherein a lower portion of the thrust pin 378 is coupled with the pin bore 380 of the second shaft; wherein the alignment feature on the thrust pin is configured to align the retainer groove on the thrust pin 378 with the retainer groove within the retainer bore 358; and wherein the thrust pin is configured to transfer tensile stress from the first shaft to the second shaft by the retaining ring installed between the retainer bore of the first shaft and the retainer groove in the thrust pin 378.

An eleventh embodiment, which is the coupling assembly of the tenth embodiment, further comprising a set of splines formed longitudinally along the outer surface of the first and second shaft mechanically couple to the splines within the coupling.

A twelfth embodiment, which is the coupling assembly of the tenth or the eleventh embodiment, wherein the thrust pin is threadingly coupled to the pin bore of the second shaft.

A thirteenth embodiment, which is the coupling assembly of any of the first through the twelfth embodiments, wherein the thrust pin is releasably coupled to the first shaft by a shear mechanism.

A fourteenth embodiment, which is coupling assembly of the tenth through the thirteenth embodiments, wherein the thrust pin is releasably coupled to the pin bore of the second shaft by a shear pin or a shear mechanism.

A fifteenth embodiment, which is the coupling assembly of the tenth through the fourteenth embodiments, further comprising a coupling plate 350 with a through hole installed within the inner surface of the coupling 310, and wherein the coupling plate 350 is configured to transfer compression loading from the first shaft to the second shaft.

A sixteenth embodiment, which is a system comprising a first section comprising a first housing and a first drive shaft; a second section comprising a second housing and a second drive shaft; wherein the first and second housing are generally cylindrical in shape with an inner chamber, and wherein the first and second drive shaft are generally cylindrical in shape; wherein the first housing is configured to mechanically couple to the first housing, the second housing, or combinations thereof; a coupling assembly comprising an upper shaft 308, a lower shaft 306, a coupling 310, and a thrust pin 378, wherein the upper shaft 306 is generally cylindrical in shape with splines formed on an outer surface and a retainer bore 358 comprising a retainer groove and a retaining ring, wherein the lower shaft is generally cylindrical in shape with splines formed on an outer surface and a pin bore 380, wherein the coupling is generally cylindrical in shape with splines formed longitudinally along an inner surface, wherein the thrust pin 378 is generally cylindrical in shape with a retainer groove on an outer surface of an upper portion; and wherein the coupling assembly is configured to transfer tensile stress from the upper shaft 308 to the lower shaft 306 by the retaining ring installed between the retainer bore of the upper shaft 306 and the retainer groove in the thrust pin 378.

A seventeenth embodiment, which is the system of the sixteenth embodiment, further comprising a pump assembly comprising at least one of the first section and the second section, wherein the first and second sections are selected from a group comprising a pump section, an intake section, or a motor section, and wherein the pump assembly is a horizontal production pump assembly or an electrical submersible pump assembly.

A eighteenth embodiment, which is the system of any of the sixteenth or the seventeenth embodiments, further comprising a thrust bearing mechanism 180 comprising a dynamic bearing 184 mechanically coupled to the drive shaft and a static bearing 186 mechanically coupled to the housing of the first section or the second section.

A nineteenth embodiment, which is the system of the sixteenth through the eighteenth embodiments, wherein the thrust bearing mechanism 180 is configured to transfer tensile stress from the drive shaft to the static bearing 186 coupled to the housing via the dynamic bearing 184 coupled to the drive shaft;

An twentieth embodiment, which is the system of the sixteenth through the nineteenth embodiments, wherein the upper shaft or the lower shaft is the first shaft, and wherein the upper shaft or the lower shaft is the second shaft.

The twenty-first embodiment, which is the pump assembly of the seventh embodiment, wherein the pump assembly is an ESP assembly comprising at least one pump section, at least one intake section, at least one seal section, and at least one motor section, wherein the pump section comprises a centrifugal pump, a progressive cavity pump, a piston pump, a rod pump, a turbine assembly, or combinations thereof, and wherein the motor section is an electrical motor or an electrical generator.

The twenty-second embodiment, which is the pump assembly of the tenth embodiment, wherein The pump assembly of claim 10, wherein the ESP assembly further comprises i) a first coupling assembly between the pump section and intake section, ii) a second coupling assembly between the intake section and the seal section, iii) a third coupling assembly between the seal section and the motor section, or iv) any combination thereof.

The twenty-third embodiment, which is the pump assembly of the tenth embodiment, wherein the at least one pump section is uphole of the motor section.

The twenty-fourth embodiment, which is the pump assembly of the tenth embodiment, wherein the at least one motor section is uphole of the pump section.

The twenty-fifth embodiment, which is the pump assembly of the seventh embodiment, wherein the pump assembly is a horizontal surface pump assembly comprising at least one motor section, at least one seal section, at least one inlet section, at least one pump section, and wherein the pump section comprises a centrifugal pump, a progressive cavity pump, a piston pump, a rod pump, a turbine pump, or combinations thereof.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, 50 percent, 51 percent, 52 percent, 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A pump assembly, comprising:
a first section including a first outer housing and a first drive shaft, wherein the first outer housing is generally cylindrical with an inner chamber and the first drive shaft is generally cylindrical with splines on an outer surface and a retainer bore;
a second section including a second outer housing and a second drive shaft, wherein the second outer housing is generally cylindrical with an inner chamber and the second drive shaft is generally cylindrical with splines on an outer surface and a pin bore;
wherein the first outer housing of the first section is mechanically coupled to the second outer housing of the second section;
a coupling assembly comprising a coupling, a thrust pin, and a retainer ring, wherein the coupling is generally cylindrical in shape with an outer surface and splines formed along an inner surface, wherein the retainer ring is generally a shaped wire wound into a circular shape and installed within a retainer groove within the retainer bore of the first drive shaft, wherein the thrust pin is generally cylindrical in shape with an upper portion, a lower portion, and installed into the pin bore of the second drive shaft;

wherein the coupling assembly mechanically couples the first drive shaft and the second drive shaft;

wherein the coupling is configured to transmit torque from the first drive shaft to the second drive shaft via the splines; and wherein the thrust pin is configured to transfer tensile stress from the retainer bore in first drive shaft to the pin bore in the second drive shaft.

2. The pump assembly of claim 1, wherein a groove on an outer surface of the thrust pin aligns with the retainer groove within the retainer bore of the first drive shaft, and wherein the retainer ring spans from the retainer groove within the retainer bore to the retainer groove on the thrust pin.

3. The pump assembly of claim 2, wherein the retainer ring is configured to install into the retainer groove on the thrust pin from the retainer groove within the retainer bore.

4. The pump assembly of claim 1, wherein the thrust pin is mechanically coupled or releasably coupled to the first drive shaft.

5. The pump assembly of claim 4, wherein the thrust pin is releasably coupled by a shear pin or a shear mechanism.

6. The pump assembly of claim 1, wherein the retainer bore includes at least two retaining rings located within at least two grooves within the retainer bore.

7. The pump assembly of claim 1, wherein the first and second section are selected from a group consisting of a pump section, an intake section, a seal section, and a motor section.

8. The pump assembly of claim 1, wherein the pump assembly is a horizontal surface pump assembly or an electrical submersible pump (ESP) assembly.

9. The pump assembly of claim 7, wherein the pump assembly is an ESP assembly comprising at least one pump section, at least one intake section, at least one seal section, and at least one motor section, wherein the pump section comprises a centrifugal pump, a progressive cavity pump, a piston pump, a rod pump, a turbine assembly, or combinations thereof, and wherein the motor section is an electrical motor or an electrical generator.

10. A coupling assembly adapted to connect a first shaft with a second shaft, the coupling assembly comprising:
a coupling cylindrical in shape with splines formed longitudinally along an inner surface;
a thrust pin generally cylindrical in shape with an alignment feature and a retainer groove on an outer surface of an upper portion;
a retainer bore extending into the first shaft comprising a retainer groove and a retaining ring;
a pin bore extending into the second shaft;
wherein a lower portion of the thrust pin is coupled with the pin bore of the second shaft;
wherein the alignment feature on the thrust pin is configured to align the retainer groove on the thrust pin with the retainer groove within the retainer bore; and
wherein the thrust pin is configured to transfer tensile stress from the first shaft to the second shaft by the retaining ring installed between the retainer bore of the first shaft and the retainer groove in the thrust pin.

11. The coupling assembly of claim 10, further comprising:
a set of splines formed longitudinally along the outer surface of the first and second shafts configured to mechanically couple to the splines within the coupling.

12. The coupling assembly of claim 10, wherein the thrust pin is threadingly coupled to the pin bore of the second shaft.

13. The coupling assembly of claim 12, wherein the thrust pin is releasably coupled to the first shaft by a shear mechanism.

14. The coupling assembly of claim 10, wherein the thrust pin is releasably coupled to the pin bore of the second shaft by a shear pin or a shear mechanism.

15. The coupling assembly of claim 10, further comprising:
a coupling plate with a through hole installed within the inner surface of the coupling, and wherein the coupling plate is configured to transfer compression loading from the first shaft to the second shaft.

16. A system, comprising:
a first section comprising a first housing and a first drive shaft;
a second section comprising a second housing and a second drive shaft;
wherein the first and second housing are cylindrical in shape with an inner chamber, and wherein the first and second drive shaft are cylindrical in shape;
wherein the first housing is configured to mechanically couple to the first housing, the second housing, or combinations thereof;
a coupling assembly comprising an upper shaft, a lower shaft, a coupling, and a thrust pin, wherein the upper shaft is generally cylindrical in shape with splines formed on an outer surface and a retainer bore comprising a retainer groove and a retaining ring, wherein the lower shaft is generally cylindrical in shape with splines formed on an outer surface and a pin bore, wherein the coupling is generally cylindrical in shape with splines formed longitudinally along an inner surface, wherein the thrust pin is generally cylindrical in shape with a retainer groove on an outer surface of an upper portion; and
wherein the coupling assembly is configured to transfer tensile stress from the upper shaft to the lower shaft by the retaining ring installed between the retainer bore of the upper shaft and the retainer groove in the thrust pin.

17. The system of claim 16, further comprising:
a pump assembly comprising at least one of the first section and the second section, wherein the first and second sections are selected from a group consisting of a pump section, an intake section, and a motor section, and wherein the pump assembly is a horizontal surface pump assembly or an ESP assembly.

18. The system of claim 16, further comprising:
a thrust bearing mechanism comprising a dynamic bearing mechanically coupled to the drive shaft and a static bearing mechanically coupled to the housing of the first section or the second section.

19. The system of claim 18, wherein the thrust bearing mechanism is configured to transfer tensile stress from the drive shaft to the static bearing coupled to the housing via the dynamic bearing coupled to the drive shaft.

20. The system of claim 16, wherein the upper shaft or the lower shaft is the first shaft, and wherein the upper shaft or the lower shaft is the second shaft.

* * * * *